(12) United States Patent
Gonzalez

(10) Patent No.: US 10,936,733 B2
(45) Date of Patent: *Mar. 2, 2021

(54) REDUCING INAPPROPRIATE ONLINE BEHAVIOR USING ANALYSIS OF EMAIL ACCOUNT USAGE DATA TO SELECT A LEVEL OF NETWORK SERVICE

(71) Applicant: Emmanuel Gonzalez, Makati (PH)

(72) Inventor: Emmanuel Gonzalez, Makati (PH)

(*) Notice: Subject to any disclaimer, the term of this patent is extended or adjusted under 35 U.S.C. 154(b) by 0 days.

This patent is subject to a terminal disclaimer.

(21) Appl. No.: 16/377,936

(22) Filed: Apr. 8, 2019

(65) Prior Publication Data

US 2019/0236289 A1    Aug. 1, 2019

Related U.S. Application Data

(63) Continuation of application No. 15/207,059, filed on Jul. 11, 2016, now Pat. No. 10,303,889.

(60) Provisional application No. 62/276,068, filed on Jan. 7, 2016.

(51) Int. Cl.
| G06F 11/00 | (2006.01) |
| G06F 12/14 | (2006.01) |
| G06F 21/60 | (2013.01) |
| H04L 29/06 | (2006.01) |
| G06F 21/31 | (2013.01) |
| G06F 21/55 | (2013.01) |

(52) U.S. Cl.
CPC .......... *G06F 21/604* (2013.01); *G06F 21/316* (2013.01); *G06F 21/552* (2013.01); *H04L 63/0421* (2013.01); *H04L 63/1408* (2013.01); *H04L 63/1425* (2013.01); *H04L 63/1483* (2013.01)

(58) Field of Classification Search
CPC .... G06F 21/604; G06F 21/552; G06F 21/316; H04L 63/1408; H04L 63/0421; H04L 63/1483
USPC .......................................................... 726/22
See application file for complete search history.

(56) References Cited

U.S. PATENT DOCUMENTS 8,281,372 B1 * 10/2012 Vidal ...................... H04L 51/12
726/5
8,453,215 B1 * 5/2013 LeBert ................ G06F 16/2343
726/4

(Continued)

*Primary Examiner* — Haresh N Patel
(74) *Attorney, Agent, or Firm* — Locke Lord LLP; Judy R. Naamat

(57) ABSTRACT

A method is provided to reduce inappropriate online behavior. The method includes providing a network service, receiving a request from a user to use the network service, and requesting a usage report about an email account associated with the user. The usage report is based on analysis of usage data representative of usage of the email account, and the analysis is based on at least one of a date that the email account was established, tracked history of emails received by the email account, and a history of IP addresses used when accessing the email account for communicating with multiple other email accounts, and the usage data is unrelated to content included in email messages exchanged by the email account. Either a first level or a second level of the network service available to the user is selected, wherein selection of the first or second level is based on whether the usage report meets selectable criteria.

30 Claims, 10 Drawing Sheets

(56) References Cited

U.S. PATENT DOCUMENTS

| | | | | |
|---|---|---|---|---|
| 8,549,651 B2* | 10/2013 | Callahan | H04L 63/105 | 705/319 |
| 8,589,495 B1* | 11/2013 | Beckert | G06F 9/542 | 709/204 |
| 8,819,453 B1* | 8/2014 | Murray | G06F 21/10 | 713/165 |
| 8,880,627 B2* | 11/2014 | Davenport | H04L 51/36 | 709/204 |
| 9,424,612 B1* | 8/2016 | Bright | G06Q 50/01 | |
| 9,456,043 B1* | 9/2016 | Froment | H04W 4/029 | |
| 9,787,662 B1* | 10/2017 | Nair | G06Q 50/01 | |
| 9,900,321 B2* | 2/2018 | Zhou | G06F 16/00 | |
| 2003/0167402 A1* | 9/2003 | Stolfo | H04L 51/12 | 726/23 |
| 2007/0016665 A1* | 1/2007 | Butler | G06Q 30/06 | 709/223 |
| 2008/0114727 A1* | 5/2008 | Lee | G06F 16/254 | |
| 2009/0300720 A1* | 12/2009 | Guo | H04L 51/12 | 726/3 |
| 2010/0169638 A1* | 7/2010 | Farris | H04L 63/0428 | 713/153 |
| 2011/0246580 A1* | 10/2011 | Goldman | G06Q 10/107 | 709/206 |
| 2012/0036015 A1* | 2/2012 | Sheikh | G06Q 30/02 | 705/14.54 |
| 2012/0130898 A1* | 5/2012 | Snyder | G06Q 20/32 | 705/44 |
| 2012/0204032 A1* | 8/2012 | Wilkins | H04L 9/006 | 713/170 |
| 2012/0221651 A1* | 8/2012 | Rabii | H04L 51/38 | 709/206 |
| 2013/0097523 A1* | 4/2013 | Kimball | G06F 3/0481 | 715/745 |
| 2013/0269700 A1* | 10/2013 | Laura Lapoint | A61B 5/0022 | 128/205.23 |
| 2013/0298238 A1* | 11/2013 | Shah | G06F 21/554 | 726/23 |
| 2014/0006522 A1* | 1/2014 | Syrowitz | H04L 51/12 | 709/206 |
| 2014/0150097 A1* | 5/2014 | Carvalho | H04L 63/14 | 726/22 |
| 2015/0100644 A1* | 4/2015 | Gulik | H04L 51/16 | 709/206 |
| 2015/0121456 A1* | 4/2015 | Milman | H04L 63/10 | 726/3 |
| 2015/0234830 A1* | 8/2015 | Bergman | G06Q 30/02 | 707/749 |
| 2015/0295871 A1* | 10/2015 | Greenstein | H04L 51/16 | 709/206 |
| 2015/0296505 A1* | 10/2015 | Luna | H04L 67/2847 | 370/329 |
| 2015/0341357 A1* | 11/2015 | Rambur | H04L 63/10 | 726/3 |
| 2015/0381533 A1* | 12/2015 | Klemm | H04L 51/02 | 709/206 |
| 2016/0014093 A1* | 1/2016 | Kalb | H04L 63/0421 | 726/4 |
| 2016/0028648 A1* | 1/2016 | Wohlert | H04L 67/18 | 709/226 |
| 2016/0072741 A1* | 3/2016 | Hamilton | H04L 51/04 | 709/206 |
| 2016/0103997 A1* | 4/2016 | Lu | H04L 63/102 | 726/22 |
| 2016/0267420 A1* | 9/2016 | Budic | G06Q 10/0631 | |
| 2017/0147155 A1* | 5/2017 | Krishnamoorthy | G06F 16/337 | |
| 2017/0200015 A1* | 7/2017 | Gonzalez | G06F 21/604 | |
| 2018/0091611 A1* | 3/2018 | Liu | H04L 67/22 | |

* cited by examiner

REDUCING INAPPROPRIATE ONLINE BEHAVIOR USING ANALYSIS OF EMAIL ACCOUNT USAGE DATA TO SELECT A LEVEL OF NETWORK SERVICE

CROSS REFERENCE TO RELATED APPLICATION

This application is a continuation of U.S. patent application Ser. No. 15/207,059 filed Jul. 11, 2016, now U.S. Pat. No. 10,303,889, which claims priority to U.S. patent application Ser. No. 62/276,068 filed Jan. 7, 2016, both of which are incorporated herein by reference in their entirety.

FIELD OF THE DISCLOSURE

The disclosed embodiments generally relate to online activities including email communication and network-based services, and more particularly, to a system and method using a history of email account usage to reduce inappropriate email and online behavior, such as email spam, online bullying and/or stalking, and online impersonation.

BACKGROUND OF THE DISCLOSURE

Email accounts are nearly universally used for communication. They are also used as identifiers for business accounts such as provided by AMAZON® or APPLE®, and for social media accounts such as provided by FACEBOOK® and TRIPADVISOR®.

The ease with which email accounts can be opened can pose problems. There are numerous online entities which host accounts and issue email addresses. Other than corporate-type accounts in which email addresses are controlled by an administrator and assigned to specific individuals, most email hosts do not verify the identity of persons signing up online for these accounts or limit the number of email accounts that a single person can obtain with the host. Additionally, email hosts do not limit users from obtaining email accounts based on whether a user has already established one or more accounts with other email hosts. Accordingly, an individual person can obtain multiple email accounts from various email hosts (such as GMAIL®, YAHOO®, etc.), and/or multiple accounts with the same host. Each email account can be effectively anonymous. Often such email accounts are used for a variety of inappropriate, including malicious, usages, such as for illegal or unethical purposes. Examples of inappropriate usages include "phishing", cyber-bullying, stalking, indiscriminate spamming, online impersonation, and fraudulent consumer reviews.

For example, an individual person can open 100 different email accounts and 100 different TRIPADVISOR® accounts, and then post 100 spurious reviews (either favorable or unfavorable) about a particular restaurant. Using inexpensive data entry labor from third world countries, firms exist that market a service to submit spurious reviews in order to destroy a competitor's reputation or build a reputation with fake reviews.

In another example, a teenager can open an anonymous email account and then send a nasty message to cyber-bully a classmate, which takes minimal time and effort without any financial cost.

In an example of fraudulent reviews, an unscrupulous vendor can arrange for a confederate to open an account, buy one unit of a product, and then post a rapturous review which is then published as a "verified purchase," after which the purchase price is returned by the vendor. Thus, for very little effort and cost, a vendor can (a) skirt government regulations associated with truth-in-advertising; and (b) tout its own product. Similarly, such a technique can also be used to cause damage to a competitor. For an expenditure of merely a few dollars, a vendor can generate false accusations against a competitor using one or more of email or an online-retailer account set up in particular for the purpose of providing customer feedback. The victim may have limited or no available remedy. The prospect of large-scale misuse of customer reviews can render online review systems unreliable and/or useless.

In another example of email abuse, a disgruntled employee can open an email account to send abusive emails to an officer of the company. Even if an offending email address was ordered blocked, the disgruntled employee can open another email account, from any of hundreds or thousands of willing email hosts, and send additional emails.

In an example related to phishing, an imposter planning to phish for specific information from a particular party can open an imposter email account using an address similar to an email address trusted by that party and send a query from the imposter email address. For example, if it is known that one of John Doe's friends uses an email accountbobjones@gmail.com, then an imposter can open imposter accountsbobjones@yahoo.com or bobjones1975@gmail.com from which the imposters ends an email to John, asking "How did your product presentation go?" John might thus be tricked into revealing confidential information.

In an example related to spam, organized spammers of malware can use multiple email accounts to bypass limits set by email hosts to control a number of messages sent or received.

In a further example related to impersonation, an imposter can use identification, such as by providing an email account, to access network-based services that the imposter is not authorized or entitled to use.

In a further example related to inappropriate consumer, seller, or posting behavior, such a user may make purchases or return purchases or post items (e.g., for sale, display, or usage) in a manner that is not consistent with a policy of the network-based service or norms of appropriate online behavior. Such inappropriate behavior can include, for example, piracy, failure to make timely payment, failure to make timely delivery of a product or service, etc.

SUMMARY OF THE DISCLOSURE

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a server is provided that includes at least one processing device configured to execute a plurality of programmable instructions to perform operations. The operation include hosting a first email account associated with an individual configured to exchange email messages with at least one other email account and accessing usage data, wherein the usage data is based on at least one of tracked usage of and statistics related to the first email account and being separate from content included in email messages exchanged by the first email account. The operations further include providing a usage report, in association with a communication by the individual, to a computing device that is aware of the communication, wherein the usage report includes at least one of at least a portion of the usage data accessed and an indication of a result of a determinations to whether the usage data accessed is consistent with a primary email account model.

In other aspects of the disclosure, a method and a non-transitory computer readable storage medium having one or more computer programs embedded therein are provided to perform the operations.

In other aspects of the disclosure, a server is provided that includes at least one processing device configured to execute a plurality of programmable instructions to perform operations. The operations include hosting a first email account associated with an individual configured to exchange email messages with at least one other email account, receiving a verification request to verify the identity of the individual from a network-based server that is configured to provide a network-based service to the individual conditional upon the individual having a verified identity, and accessing usage data, wherein the usage data is based on at least one of tracked usage of and statistics related to the first email account and being separate from content included in email messages exchanged by the first email account. The operations further include providing to the network-based server in response to the verification request, a usage report including at least one of at least a portion of the usage data accessed and an indication of a result of a determination as to whether the usage data accessed is consistent with a primary email account model In further aspects of the disclosure, a computing device is provided that includes at least one processing device configured to execute a plurality of programmable instructions to perform operations. The operations include receiving an indication that an email message has been sent from a first email account hosted by at least one email server to a second email account hosted by the at least one email server and receiving a usage report based on accessed usage data associated with usage of the first email account, wherein the usage data indicates at least one of tracked usage of the first email account, statistics related to usage of the first email account, and an indication of results of an evaluation of the usage data, the usage report and usage data being separate from content included in email messages exchanged in the first email account. The operations further include determining whether the usage report satisfies predetermined criteria, selecting a first delivery treatment of the email message when it is determined that the predetermined criteria are satisfied, and selecting a second delivery treatment of the email message that is different than the first delivery treatment when it is determined that the predetermined criteria are not satisfied.

In still further aspects of the disclosure, an email provider system is provided that includes at least one processing device configured to execute a plurality of programmable instructions to perform operations. The operations include hosting first and second email accounts configured to exchange email messages with one another and accessing usage data, wherein the usage data includes data about usage of the first email account that is unrelated to content included in email messages exchanged by the first email account. The operations further include providing a usage report, in association with a request to transmit an email from the first email account to the second email account, to a computing device that is aware of the request to transmit, wherein the usage report includes at least one of at least a portion of the usage data and an indication of a result of a determination as to whether the usage data accessed is consistent with a primary email account model.

Additionally, in aspects of the disclosure, an email provider system is provided that includes at least one processing device configured to execute a plurality of programmable instructions to perform operations. The operations include hosting a first email account configured to exchange email messages with a second email account hosted by a second email provider system and accessing usage data, wherein the usage data includes data about usage of the first email account that is unrelated to content included in email messages exchanged by the first email account. The operations further include providing a usage report, in association with a request to transmit an email from the first email account to the second email account, to a computing device that is aware of the request to transmit, wherein the usage report includes at least one of at least a portion of the usage data accessed and an indication of a result of a determination as to whether the usage data is consistent with a primary email account model.

Furthermore, in aspects of the disclosure, an email provider system is provided that includes at least one processing device configured to execute a plurality of programmable instructions to perform operations. The operations include hosting a second email account configured to exchange email messages with a first email account, receiving a selection of parameters of a model of a primary email account from a user of the second email account, and receiving a usage report in association with a request from the first email account to transmit an email message to the second email account, wherein the usage report includes data about usage of the first email account that is unrelated to content included in email messages exchanged by the first email account. The operations further include selecting a first delivery treatment for delivery of the email message to the second email account if it is determined that the usage report is consistent with the selection of parameters of the primary email account model, and selecting at least one second delivery treatment that is different than the first delivery treatment for delivery of the email message to the second email account if it is determined that the usage report is not consistent with the selection of parameters of the primary email account model.

In accordance with further aspects of the disclosure, a method is provided to reduce inappropriate online behavior. The method includes providing a network service, receiving a request from a user to use the network service, and requesting a usage report about an email account associated with the user. The usage report is based on analysis of usage data representative of usage of the email account, and the analysis is based on at least one of a date that the email account was established, tracked history of emails received by the email account, and a history of IP addresses used when accessing the email account for communicating with multiple other email accounts, and the usage data is unrelated to content included in email messages exchanged by the email account. Either a first level or a second level of the network service available to the user is selected, wherein selection of the first or second level is based on whether the usage report meets selectable criteria.

In embodiments, the method can further include selecting the second level when the usage report does not meet the selectable criteria, denying availability of the network service or providing a reduced availability of the network service when the second level is selected, selecting the first level when the usage report does meet the selectable criteria, and providing a non-reduced availability of the network service when the first level is selected.

In embodiments, the network service can be a social media service. The usage report can include at least a portion of the usage data, the usage report can include at least statistics calculated based on the usage data, and the usage report can indicate whether the usage data is consistent with a primary email account model.

In embodiments, the method can further include selecting the first or second level based on a determined level of consistency between network-based service data indicative of usage of the network service by the user and the usage data.

In embodiments, the method can further include comparing the network-based service data to the usage data and generating consistency data based on the comparison. The consistency data can indicate a level of consistency between the usage data and the network-based service data, the level of consistency being based on at least one of (a) consistency between a geographic location of an IP address associated with usage of the email account and the network based service and (b) consistency between an age or occupation of the user indicated by a profile or usage associated with the email account and a profile or usage associated with the usage of the network-based service by the user. The selection of the first or second level of service can be based on a level of consistency indicated by the consistency data.

In embodiments, the method can further include determining the level of consistency based on temporal and location data associated with the usage data as compared with temporal and location data associated with usage of the network-based service data by the user.

In embodiments, the usage report can indicate at least one of: statistics associated with a number of email messages exchanged with the email account, statistics associated with a size of messages exchanged with the email account, statistics associated with a type of one or more attachments exchanged with the email account, an indication whether the email account has an associated profile picture, and an indication whether the email account has an associated verified telephone number.

In embodiments, the network-based service can include at least one of posting data to a website, responding to a social-network prompt, entering data in a query box in a website, participating in an online chat or forum, submitting a consumer review of a product or service, exchanging private or public messages, voting in a poll, and transacting a financial transaction.

In embodiments, the request can be to establish a new account for the user to have access to the network service, and providing the network service can include establishing the new account when the first level is selected, and denying establishment of the new account when the second level is selected.

In accordance with additional aspects of the disclosure, a server is provided to perform the aforementioned method of the disclosure. In still further aspects of the disclosure, provided are a non-transitory computer readable storage medium and one or more computer programs embedded therein. The computer programs include instructions, which when executed by a computer system, cause the computer system to perform the message of the disclosure.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
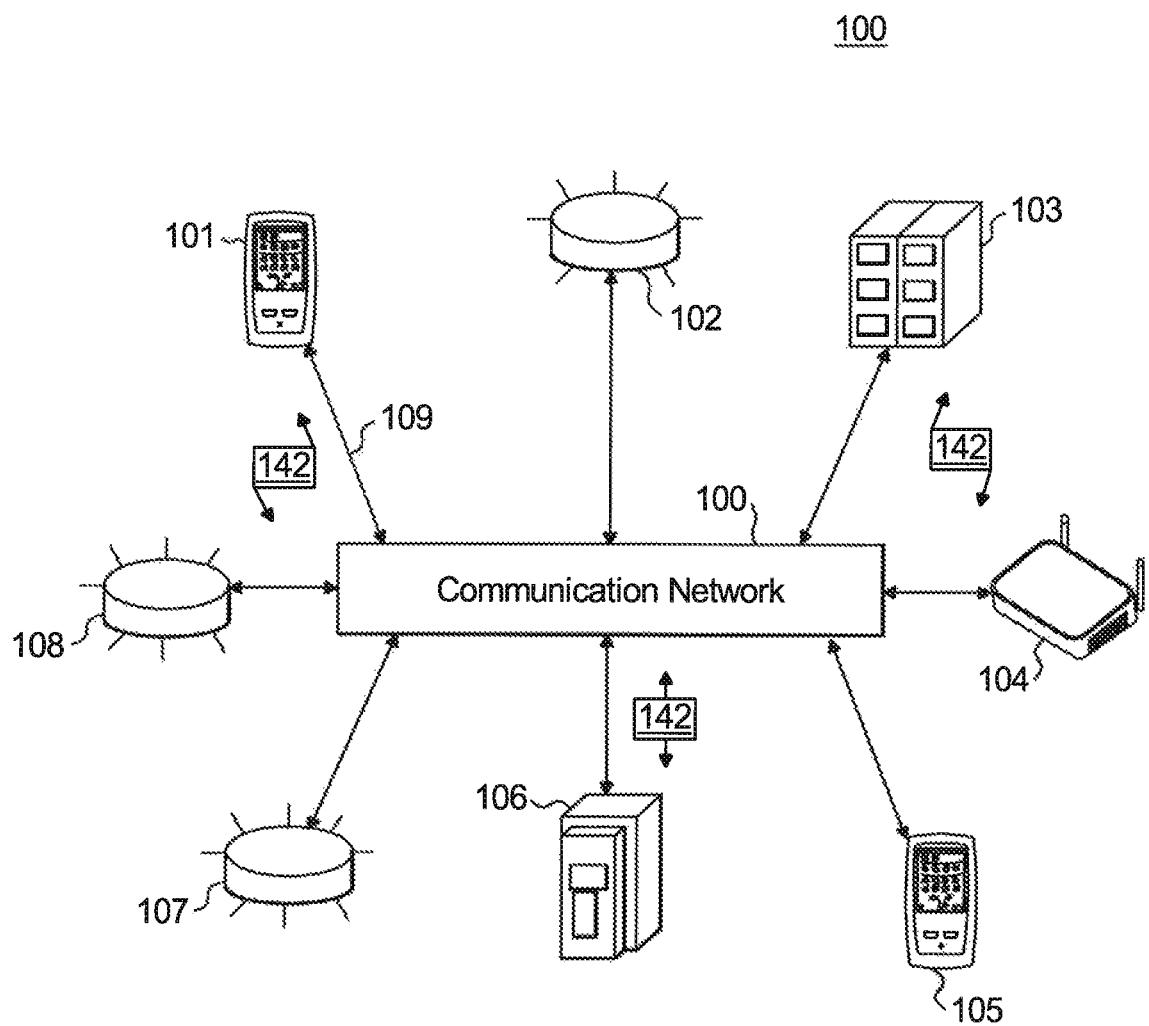
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes overlong-distance communications links, such as common carrier telephone lines, optical light paths, synchronous optical networks (SONET), synchronous digital hierarchy (SDH) links, or Power line Communications (PLC), and others.

FIG. 1 is a schematic block diagram of an example communication network 100 illustratively comprising nodes/devices 101-108 (e.g., sensors 102, client computing devices 103, smart phone devices 105, webservers 106, routers 107, switches 108, and the like) interconnected via links 109 by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
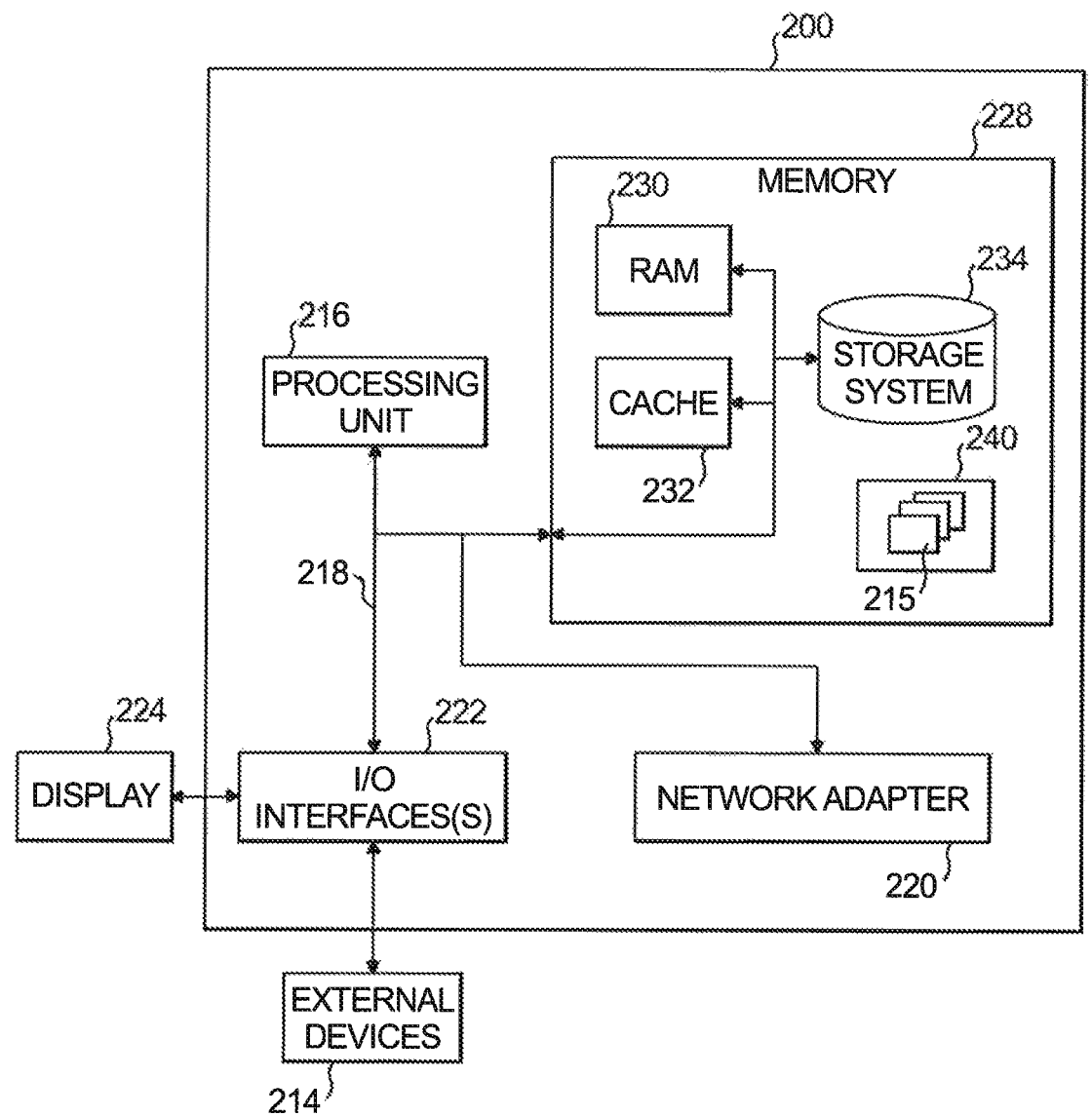
FIG. 2 illustrates an example network device/node.
Figure 3:
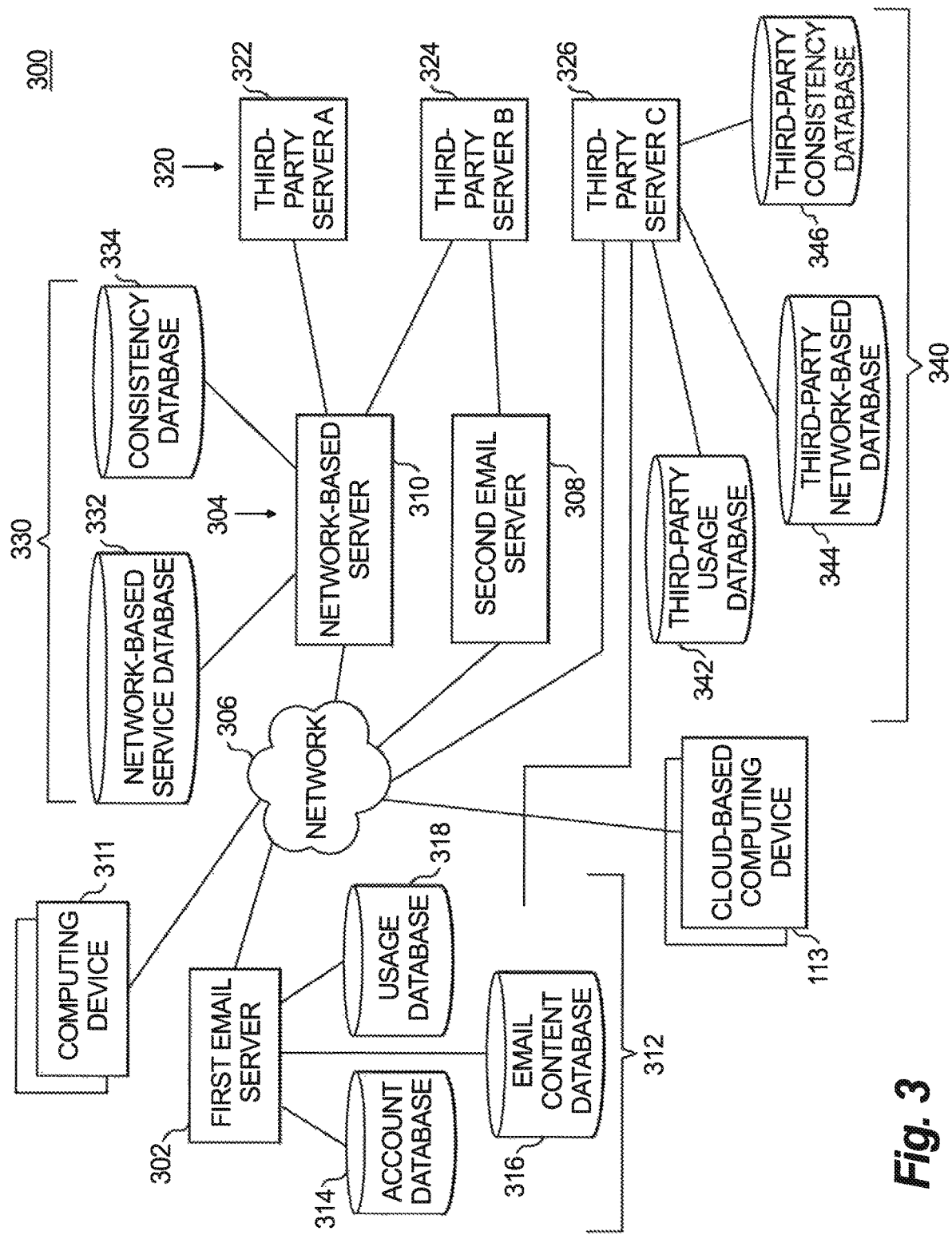
FIG. 3 is a block diagram of an example usage data verification system in accordance with the present disclosure.

FIG. 2 is a schematic block diagram of an example network computing device 200 (e.g., client computing device 103, server 106, etc.) that maybe used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and soon that perform particular tasks or implement particular abstract datatypes. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

In the description that follows, certain embodiments may be described with reference to acts and symbolic representations of operations that are performed by one or more computing devices, such as the computing system environment 200 of FIG. 2. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments of the present invention will now be provided. With reference now to FIGS. 3-10, a usage data verification system 300 is generally shown in which a first email server 302 communicates with one or more second-party servers 304 via a network 306 (e.g., the Internet) to verify a user based on usage data associated with an email account. In the example embodiment shown, the second-party servers 304 include a second email server 308 and a network-based server 310.

The usage data verification system 300 can include one or more computing devices 311 which can communicate with the first email server 302 or the various second party servers 304. The computing devices 311 can access the second email server 308, such as to access an email account that exchanges emails with an email account hosted by the first email server 302. Computing devices 311 can also access the network-based server to access a service provided by the network-based server. The usage data verification system 300 can include one or more cloud-based computing devices 313 that communicate with the first email server 302 or one or more of the second-party servers 304, such as to provide processing or storage support for the corresponding second-party server(s) 304. The computing device 311 can be, for example, an email delivery mechanism (e.g., an interim server, agent, etc.), a device operated by a second individual using the second email account, such as a mobile or stationary device, e.g., a cellular phone, smart phone, desktop computer, tablet, laptop computer, etc. The cloud-based computing device 313 can be, for example, an interim server or a storage system.

The first email server 302 further communicates with at least one storage system 312 that includes an accounts database 314, a content database 316, and a usage database 318. In addition, third-party servers 320 can communicate with the first email server 302 and/or the second-party servers 304 as participants in the email verification process. In the example shown, the third-party servers 320 include third-party server A 322, third-party server B 324, and third-party server C 326. Third-party server A 322 is dedicated to serving the network-based server 310, whereas third-party server B 324 services the network-based server 310 and the second email server 308. Third-party server C 326 collects data from and shares data with multiple email and network-based servers, such as on a contractual basis.

In the example shown, the network-based server 310 communicates with a third storage system 330 that includes a network-based service database 332 and a consistency database 334. The third-party server C 326 communicates with a second storage system 340 that includes a third-party usage datable 342, a third-party network-based service database 344, and a third-party consistency database 346.

Each of the servers 302, 304, 320 are configured similarly to network computing device 200 depicted in FIG. 2, the network 306 can be configured similarly to the communication network 100 depicted in FIG. 1, and the storage systems 312, 330, and 340 can be configured similarly to the storage system 234 shown and described with respect to FIGS. 1 and 2. The communication links between any of the servers 302, 304, 320 and between the first email server 302 and the storage system 312 can be wired or wireless, and can include communication links of the network 306.

First email server 302 hosts email accounts. Hosting email accounts includes facilitating transmission and receipt of emails to and from an email account, which is referred to as exchanging emails. First email server 302 communicates with at least one user to register the user and establish an email account for the user. The terms "user" and "individual" are used interchangeably in this disclosure, and can refer to a single person, a group of people, a titled position (e.g., administrator or assistant to a particular person or officer) that can include different individuals at different times. A user of individual refers to a person who uses an email account or network-based service. The user or individual using the email account or network-based service can be different from the person that performed the registration, such as in the case of registration tasks performed legitimately on behalf of another person, or in the case of impersonation. The first email server 302 stores account information about the user and the user's email account in account database 314. Once the account is established, the first email server 302 facilitates sending and receiving emails via the email account. The actual emails, including their content, are stored as email data in email content database 316.

In embodiments, the first email server 302 can track usage of the first email account and generate associated tracking data. In embodiments, the first email server 302 can determine statistics associated with usage and emails associated with the first email account and generate statistical data. The first email server 302 can store the tracking data and/or the statistical data as usage data in usage database 318.

The usage data can provide a profile of the first email account that can be compared to a model profile of a primary email account (described further below). For example, the usage data can include statistics and/or information about usage associated with the first email account.

The usage data is unrelated to the actual message content, meaning the usage data does not include and is not determined by actual message content included in the email messages associated with the first email account that is exchanged (e.g., sent and/or received) with another email account. In other words, the usage data is separate from the actual content in the exchanged email messages, meaning the usage data does not include and is not determined by the actual content of email messages or copies thereof, but rather includes data about the email account or data about the exchange of email messages using the account.

The usage data can be included in a usage report from a network-based server 310 to the first email server 302 that reports an instance of inappropriate online behavior by a user who used the first email account to register to use the network service. Determinations about the usage data can also be included in the usage report. References to usage data can include usage data that is included in a usage report. Likewise, references to a usage report can include usage data that is included in the usage report.

Inappropriate online behaviour can include behaviour that suggests that the user used the network services negligently or for malicious purposes that are inconsistent with a policy of the network-based service and/or norms of appropriate online behaviour. Examples of inappropriate online behaviour include impersonating another person or engaging in inappropriate consumer, seller, or posting behavior (e.g., piracy, trademark or patent infringement), failure to make timely payment, failure to make timely delivery of a product or service, etc.

The usage data or usage report can include, for example, the date the first email account was created; geographic location of an IP address used to open the first email account; IP address the email is being sent from; a measure of repeatedly performing a task, such as a number of times a same email was sent; a number of different email addresses that emails were received from or sent to; IP location of each access to the first email account; statistics associated with a number of email messages sent and/or received by the first email account (e.g., average number of daily outgoing emails from the first email account in a time interval; average number of daily incoming emails for the first email account in a time interval; a number of days with no account activity within a time interval; statistics associated with a size of messages sent and/or received by the first email account; statistics associated with a type of one or more attachments sent and/or received by the first email account; an indication whether the first email account has an associated profile picture; an indication whether the first email account has an associated verified telephone number; statistics regarding a number of words included in email messages, statistics regarding a number of number of recipients designated in email messages, statistics regarding frequency of usage of particular words in email messages, statistics regarding a number or frequency of occurrences of unidentifiable character-strings, and/or one or more reports of inappropriate online behavior associated with the first email account that were provided by a network-based service for behaviors such as impersonation or inappropriate consumer, seller, or posting behavior.

In a further example, the usage data or usage report can include the results of a determination whether usage of the first email account is consistent with a primary email account model, e.g., a score that represents the results of a comparison between the usage data that was analysed and predetermined criteria, based on the expected statistics for a primary email account (described in greater detail below). The score can include a Pass/Fail determination, where Pass suggests a high likelihood that the email account in question is the primary email account of an actual individual person. In another example, the usage data can include a certificate that indicates whether or not usage data that was analysed satisfies predetermined criteria.

In embodiments, the usage report can be represented as metadata that can be associated with, for example, an email sent from the first email account. The first email server 302 can embed or append metadata to the email being sent by the first email server 302 or send the metadata in a separate message.

On the other hand, the email content, which is not accessed for generating or determining user data, includes the data that is sent in the body of the email or attached to the email as an attachment. The content can include, for example, alphanumeric data, graphic data, and/or media or multi-media files (including any combination of images video, and audio data). This data can be user-generated data that is selected or generated by the user associated with the account from which the email was sent. Such user-generated data can include, for example, text generated by the user; attachments selected and attached to the email by the user that sent the email; or automatically generated messages; such as do-not-reply or out-of-office message.

In embodiments, the usage data is evaluated and the usage data and/or results are reported by the first email server 302 as a usage report to a third-party server 320, the second-party server 304, a computing device 311, or a cloud-based computing device 313. The usage report can include data that was evaluated and/or results of the evaluation. In embodiments, the recipient of the usage report evaluates the usage report and makes its own determination of whether the first email account is consistent with a primary email account.

The results of the evaluation can be interpreted by the recipient as a probability of whether the email was sent from a primary email account that is used for constructive, non-malicious purposes, or a secondary email account, which might therefore be suspected to have been created for malicious purposes. In other words, the usage report can be used by the recipient to profile the first email account and make a determination whether usage of the first email account is consistent with a primary email account model, The results of the evaluation can be used by the recipient as a determination that influences its actions (e.g., to block an email, decline access to network services, etc.) and/or as a recommendation that it uses to generate warnings or perform further investigation.

In embodiments, evaluation of the usage report can include comparing the usage data included in the usage report to predetermined criteria for expected usage. The predetermined criteria can be, for example, parameters of a model primary email account. The results of the comparison can be used to determine whether a profile of the first email account, which is used by a particular individual, is consistent with the primary email account model. The primary email account model can model an email account that is intended for appropriate email use and indicates established appropriate email usage. When a profile of an email account is consistent with the primary email account model, this is an indication that the email account is being used for appropriate purposes. When a profile of an email account is inconsistent with the primary email account model, this is an indication that the email account is being used for inappropriate and potentially malicious purposes.

In embodiments, a user may have more than one primary email account, e.g., an email account having a profile that is deemed to be consistent with the primary email account model. In embodiments, a user may be limited to a particular quantity of primary email accounts. In embodiments, the user may be limited to only a single primary email account.

A primary email account may be characterized, for example, by parameters such as: a predetermined duration of time since the email account was created; logical usage of geographic location of IP addresses used to open or use the first email account, such as the locations from which emails were transmitted within a predetermined time interval being within a predetermined radius; usage of a verified IP address to send emails; not exceeding a predetermined threshold of repeatedly performing a task, such as a number of times a same email was sent; a number of different email addresses that emails were received from or sent to being within a predetermined range; predetermined thresholds for statistical characteristic; existence of an associated profile picture, an associated verified telephone number, lack of reports of inappropriate online activity associated with the first email address reported by a network-based server 310, etc.

In embodiments, the first email server 302 can provide, in association with a communication that involves one of the second-party servers 304, at least a portion of the usage data accessed to a computing device that is aware of the communication involving the second-party server 304. The communication can be, for example, one of the second email servers 308 hosting an email account that is receiving an email from the first email account. In another scenario, the communication can be a user using or attempting to a use a network-based service provided by one of the network-based servers 310. The computing device can be, for example, the second-party server 304 itself; a cloud-based computing device 313 that communicates with the second-party server 304, such as to provide storage or processing support to the second-party server 304; or a device operated by the user that is receiving the email from the first account or is attempting to or is using the network-based service.

In embodiments, the first email server 302 can provide, in association with a communication that involves the second-party server 304, an indication of a result of a determination as to whether the profile of the first email account is consistent with a primary email account model used by the individual. The determination can be performed by the first email server 302 or a third-party 320. The indication can be, for example, a score or a certificate that indicates similarity between the email account and a model account that characterizes a primary email account. The second-party server 304 that receives the usage report can be a second email server 308 or a network-based server 310. Additionally, the usage data and/or usage report can be accessed by a third-party server 320. Accessing data herein refers to retrieving data, intercepting data, receiving transmitted data, and reading data. In the example shown, usage data and/or usage report stored in usage database 318 can be accessed by the third-party server C 326, and/or the usage report and/or usage data can be transmitted to the third-party server C 326 via network 306, after which third-party server C 326 stores the usage data and/or usage report in the third-party usage database 342.

The second email server 308 that receives the email message can read, interpret, and react to the usage report, such as by determining delivery treatment of the email once it has arrived at the second email server 308. Additionally, email delivery mechanisms (e.g., interim servers, agents, etc.) involved in transmitting the email from the first email server 302 to the second email server 308 can read, interpret, and react to the usage report, such as by determining delivery treatment of the email while the email is in transit to the second email server 308. For example, when a mechanism that receives or sends the email as it is in transit from the first email server 302 to the second email server 308 recognizes that the usage report does not meet the predetermined criteria, the mechanism can flag, block, auto-reply, or otherwise treat the email while it is in transit.

Figure 4:
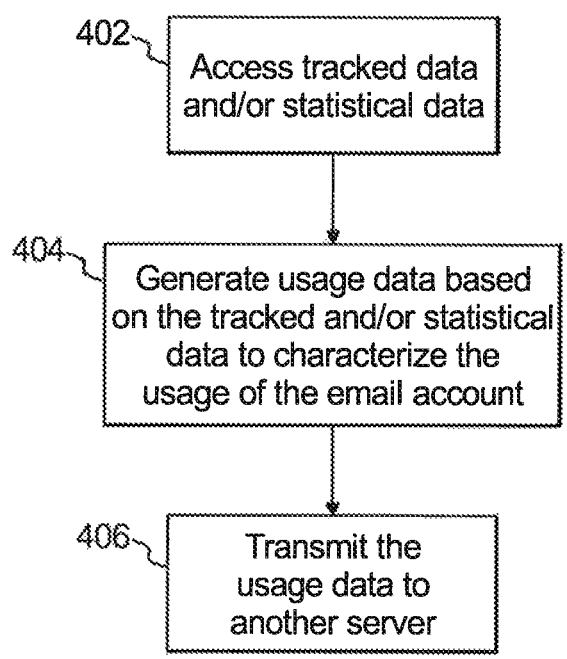
FIG. 4 is a flowchart illustrating an example method performed by a server of the usage data verification system shown in FIG. 3 in accordance with embodiments of the disclosure.
Figure 5:
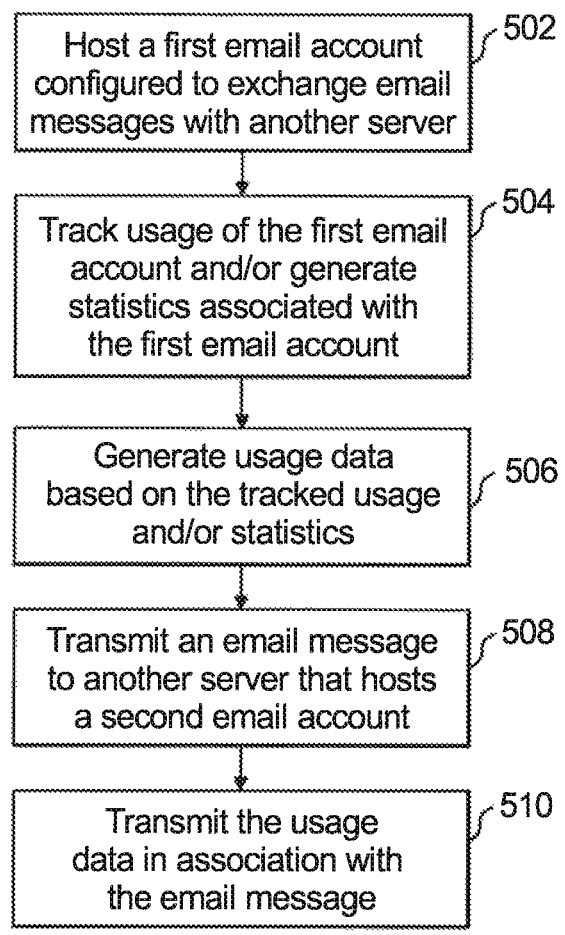
FIG. 5 is a flowchart illustrating an example method performed by an email server of the usage data verification system shown in FIG. 3 in accordance with embodiments of the disclosure.

With reference now to FIGS. 4-10, shown are flowcharts demonstrating implementation of the various exemplary embodiments. It is noted that the order of operations shown in FIGS. 4-5 is not required, so in principle, the various operations may be performed out of the illustrated order. Also certain operations may be skipped, different operations may be added or substituted, or selected operations or groups of operations may be performed in a separate application following the embodiments described herein.

FIG. 4 shows a flowchart 400 of operations performed in accordance with an embodiment of a method of the disclosure. In various embodiments, the operations shown in flowchart 400 can be performed by an email server, such as the first email server 302, or one of the third parties 320. The third-party can be provided with access to the tracked data, which can include performing the tracking or obtaining the tracked data from a different processing device that performed the tracking. In various embodiments, the second-party server can be the second email server 308, the network-based server 310, or a third-party 320. The third-party 320 can be a server that collects the tracked data from a single email server or a plurality of email servers.

At operation 402, tracked data and/or statistical data is accessed, wherein the tracked data tracks usage of the first email account and the statistical data indicates statistical relationships of aspects of the first email account. At operation 404, usage data based on the tracked and/or statistical data is generated. The usage data characterizes usage history associated with the first email account, and is separate from user-generated content included in email messages associated with the first email account. At operation 406, the usage data is accessed by (e.g., transmitted to) a second-party server as an indicator of the usage.

In embodiments, the second-party server 304 is the network-based server 310 which is configured to use an email address associated with an email account as identification for a user to use a service provided by the network-based server 310. For example, network-based server 310 may provide a network-based service, such as a social network service. An example of a social network service is TRIPADVISOR® in which users share travel advice and can post reviews of travel related products and services, such as hotel reviews.

The users may be required by the network-based server 310 to provide an email address as identification. In accordance with an example, the email address is associated with an email account hosted by the first email server 302. The network-based server 310 can automatically send a query to the first email server 302 to obtain usage data about the email account. The first email server 302 can automatically respond to the query by providing a usage report to the requesting network-based server 310.

Providing the usage report can include providing all of the usage data (or access thereto) or a selected portion of the usage data (or access thereto). The network-based server 310 can automatically compare the usage report to predetermined criteria. For example, the predetermined criteria can indicate whether the user is a genuine person, or a marketing company that provides a service of posting spurious reviews. The outcome of the comparison can be used by the network-based server 310 to allow or deny the user from using services provided by the network-based server 310. This process can be performed without exchanging any emails between the network-based server 310 and the user.

The network-based server 310 can store network-based service data in the network-based service database 332. The network-based service data includes data about usage of a service provided by the network-based server 310 by respective users. The network-based service data can include, for example, a location of an IP address used by a user when using the service, a time (e.g., date and/or/time of day) at which the services where used by the user, and/or an alleged location of the user at a particular time (such as indicated by content in a review of a particular venue).

The network-based service data can be accessed by a third-party server 320. In the example shown, network-based service data stored in network-based service database 318 can be accessed by the third-party server C 326, and/or the network-based service data can be transmitted to the third-party server C 326 via network 306, after which third-party server C 326 stores the network-based service data in the third-party usage database 342.

A consistency analysis can be performed by the network-based server 310 or a third-party server 320. The consistency analysis can include a comparison of the usage data or usage report to the network-based service data, to determine if they are consistent and corroborate one another, are contradictory, or are neutral. The consistency analysis can include determining a location of usage, such as by identifying a geographic allocation associated with an IP address or a geolocation of a device used when using the first email account and the network-based services. Timestamps (e.g., date and/or time of day) can be associated with usages and locations of usages.

The consistency analysis can further include identifying content of location data entered by a user using the network-based services, wherein the location data indicates that a user was at a particular location at a particular time. The particular location and time can include a general designation (e.g., a continent, a country, a city, a season, a month, a year) or a specific designation (e.g., an address, a latitude/longitude, a place of business (e.g., a store or restaurant), a date, a time of day). The consistency analysis can include comparing location and time information identified in the usage data and the network-based service data to determine if they conflict, corroborate, or are neutral with respect to one another.

Additionally, the consistency analysis can determine if the network-based service data indicates information about the user that is verifiable based on information available about the user through a profile of the user obtained in association with the first email account. Examples of verifiable information include occupation, gender, and age.

For example, when the user posts a review, content of the review included in the network-based service data can be compared to the usage report or usage data to determine if there are any indications that the usage report or usage data conflict with the network-based service data. Consistency data can be generated based on results of the comparison. The consistency data indicates a degree of consistency between the usage report or usage data and the network-based service data, which can be used to verify the user, e.g., to verify authenticity or acceptable network-based behaviour using services or email. For example, the consistency data can include an authenticity score that indicates strength of determination of user authenticity. The authenticity score can be adjusted based on an on-going consistency analysis of the usage report/usage data and the network-based service data as new usage data and network-based service data are generated as the user continues to use the network-based service and the email account used to verify the user for use of the network-based service.

In another example, when a user posts information on a dating site that contradicts the user's age or occupation indicated by the user's email profile, a conflict is determined and verification can fail and an authenticity score can be decreased. On the other hand, when the user's posts are consistent with the data in the user's email profile, corroboration is determined and the user's authenticity score can be increased.

The network-based server 310 can perform the consistency analysis and store the associated consistency data in the consistency database 334. The network-based server 310 can then use the consistency analysis to allow or deny access to its services or to share with other servers, such as the first email server 310 or a third-party 320. A plurality of servers, e.g., first-party servers (such as first email servers 302), second-party servers 304 and third-party servers 320 can generate, share, and/or compare data, such as usage reports, usage data, network-based service data, and consistency data.

The network-based server 310 can transmit the consistency data, for example, to the third-party server C 326, such as via network 306, after which third-party server C 326 stores the consistency data in the third-party consistency database 342. In embodiments, the third-party server C 326 can perform a consistency analysis using usage reports or usage data stored in the third-party usage database 342 and network-based service data stored in the third-party network-service database 344, and store the results as consistency data in the third-party consistency database 346.

FIG. 5 shows a flowchart 500 of operations performed in accordance with an embodiment of a method of the disclosure. In various embodiments, the operations shown in flowchart 500 can be performed by an email server, such as the first email server 302. At operation 502, a first email account is hosted that is configured to exchange email messages with another email account, e.g., to facilitate sending and receiving email messages. At operation 504, usage of the first email account is tracked and/or statistics associated with the first email account are generated. At operation 506, usage data based on the tracked usage and/or statistics is generated. The usage data can characterize usage history associated with the first email account, and is separate from user-generated content included in email messages associated with the first email account. At operation 508, an email message is transmitted to another email server that hosts a second email account, such as the second email server 308. At operation 510, selected usage data is transmitted as a usage report in association with the email message, such as by metadata sent with the email message, or in a separate message that identifies the email message.

Figure 6:
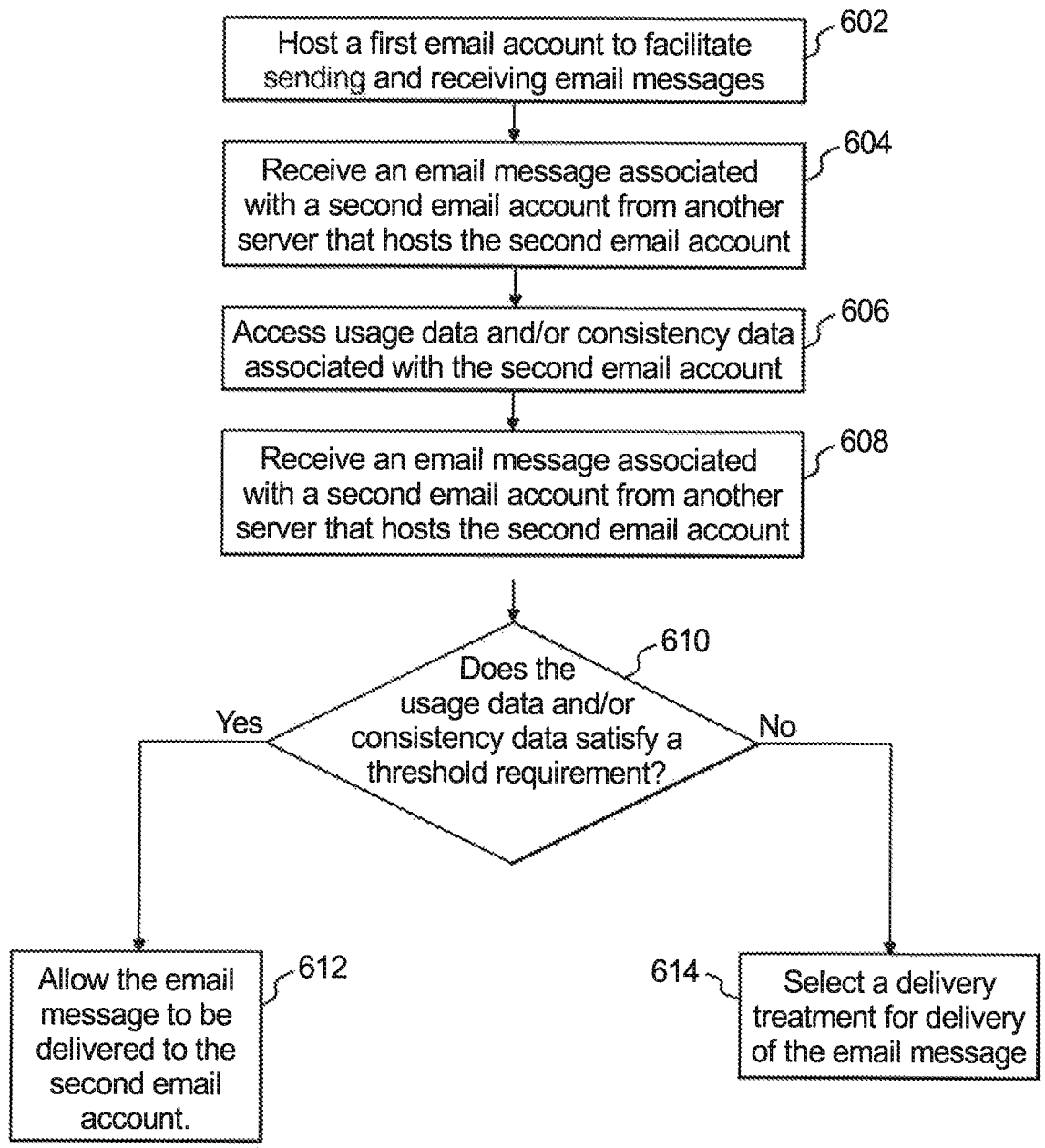
FIG. 6 is a flowchart illustrating another example method performed by an email server of the usage data verification system shown in FIG. 3 in accordance with embodiments of the disclosure.

FIG. 6 shows a flowchart 600 of operations performed in accordance with an embodiment of a method of the disclosure. In various embodiments, the operations shown in flowchart 600 can be performed by a first email server system, such as the second email server 308. At operation 602, a first email account is hosted by the first email server system, wherein the first email account is configured to exchange email messages with another email account, such as to facilitate sending and receiving email messages to and from the other email account, which can be hosted by another server. At operation 604, an email message associated with a second email account is received. The second email account is hosted by a second email server system, such as the first email server 302. At operation 606, usage reports, usage data, and/or consistency data associated with the second email account are accessed. The usage reports, usage data, and/or consistency data can be retrieved or can be received, for example, with transmission of the email message (e.g., as metadata) or in response to a request. The usage reports, usage data, and/or consistency data can be provided by the second email server system or a third-party, such as one of third-parties 320.

At operation 608, the first email server system determines whether the usage reports, usage data, and/or consistency data satisfy predetermined criteria. Determining whether the predetermined criteria are satisfied can include determining whether the usage reports and/or usage data are consistent with parameters of a primary email account model. The parameters can be selectable, such as by a user or administrator of the first email account.

If the determination at operation 608 is YES, then at operation 610 the email message is allowed to be delivered to the first email account. If the determination at operation 608 is NO, then at operation 612, the first email server system selects an alternative delivery treatment for delivery of the email, the alternative delivery system being different than allowing the email message to be delivered.

Examples of different delivery treatment that the first email server system may select include: deletion and non-delivery of the email message with no notice to the first or second email accounts; deletion and non-delivery of the email message, but with notice to at least one of the first and second email accounts that the predetermined criteria associated with the second email account were not met; delivery of the email message to the first email account with notice that the predetermined criteria associated with the second email were not met; non-delivery of the email pending a request from the first email account with notice that the predetermined criteria associated with the second email account were not met and that delivery of the email message is available for a limited time period pending a request from the first email account.

In embodiments, the first delivery treatment can be selected even if the threshold criteria associated with the email message were not met when an override condition is satisfied. The override condition can include, for example, and without limitation, inclusion of a predetermined character sequence in the content of the email message or a determination that the second email account that sent the email message is included in a whitelist of approved email accounts. Email messages sent form email accounts included in the whitelist can thus be delivered regardless of whether the threshold criteria are met.

Although the example described uses the second email server 308 as the first email server system, one having skill in the art will understand that in embodiments, the roles of the first and second email servers 302 and 308 can be reversed, such that the first email server functions as the first email server system and the second email server functions as the second email server system.

In a scenario, a legitimate user may attempt to open a new email account. Special procedures can be used to allow opening such a new email account, such as providing a whitelist of users that have undergone an alternative verification system which an email server can consult. If the user is included on the whitelist, the email server can forego using usage data to determine the legitimacy of the user.

In a scenario, a user may object to tracking usage data. In embodiments, the first user of the first email account that sent the email message can select an option to restrict access to and/or transmission of the usage data. The first user, however, may be provided with limited rights, such that email messages sent by the first user or access by the first-user to network-based services may be restricted unless the first user can provide alternative verification of his appropriate usage of email services or network-based services.

In embodiments of the method illustrated by flowchart 600, the alternative delivery treatment can be selectable. The same or different rules can be applied to all email accounts hosted by the second email server 308 to determine the alternative delivery treatment, or the user of the first email account that receives the email message can select the alternative delivery treatment. Selection of the alternative delivery treatment can be made before the email message is received or after the email message is received.

The predetermined criteria can also be selectable. The same or different predetermined criteria can be applied to the email accounts hosted by the first email server system. In embodiments, the user of the first email account can select the predetermined criteria. Selection of the predetermined criteria can be made before the email message is received, or after the email message is received.

In embodiments, the third-party 320 can select the rules to apply for determining the delivery treatment, the delivery treatment, and/or the predetermined criteria to be applied.

The first email server system can request that all users holding an account hosted by the first email server system specify standing instructions on how to filter inbound emails based on the usage data and/or consistency data. Incoming emails would be compared with the standing instructions and disposed of accordingly. For example, the user associated with the first email account may specify that if an email comes from an account that has more than N (e.g., 100) outbound emails on more than one day within the past month, or if the associated email account has sent out M (e.g., 100) identical email messages, then that email would be immediately discarded into a junk folder. This can decrease the occurrence of unsolicited email, e.g., spam reaching targeted recipients, and deter the future use of spam.

In another example, a user who is being cyber-bullied can configure his/her email service-provided filter to block emails from accounts that were not established before at least a predetermined date (e.g., one year before the subject email), and/or have had at least N (e.g., 100) inbound or outbound emails in the year. Emails sent from email accounts that do not meet the criteria selected by user can be prevented from being delivered without causing harm to the user or being noticed by the user. Even if a party sending malicious or unsolicited emails suspected that some type of filtering was being used (e.g., due to a victim user's failure to react), the party may consider circumventing the filtering by registering for a new account in an attempt to preserve anonymity (e.g., using fake information) and using the email account sufficiently to appear as genuine, without knowledge of whether or when an unsolicited message would be delivered. Since the circumvention is time consuming and requires effort, the usage data verification system 300 may tend to deter and discourage transmission of unsolicited messages, such as sending spam or cyber-bullying emails. Although a few unsolicited emails may reach their destination, cyber-bullying from make-shift email addresses may be significantly decreased.

A third-party server 320 can be a central address for storing and combining usage data and consistency data from other servers. For example, the network-based server 310 can provide to third-party server C326 network-based service data that includes reviews submitted by a user about travels in Munich in October 2015 (e.g., hotel and restaurant reviews). An email server system (e.g., first or second email servers 302 or 308) can provide to the third-party server C 326 usage data associated with an email account established by the same user. Different combinations of data from different sources can be compared, such as network-based service data and/or usage data attributed to a particular user. Based on the comparison, a determination can be made whether there is consistency between the data from different sources. Consistency data can be generated based on the determination of consistency. The consistency data can indicate whether the data from different sources corroborate one another and establish strong consistency, or contradict one another and establish weak consistency.

The comparison can be performed by the third-party server C 326 or a server that accesses the network-based service data and usage data. Access to the network-based service data and usage data can be provided by the third-party server C 326 to subscribing users. Alternatively, email servers (e.g., first and/or second email servers 302, 308) and/or network-based servers (e.g., network-based server 310) can exchange network-based service data and usage data. Any of the first and second email servers 302 and/or 308, network-based server 310, and/or third-party servers 320 can perform a comparison of data from different sources, determine consistency of the compared data, and generating consistency data based on the determination of consistency.

For example, the network-based server 310 can determine if the usage data associated with the user's email account uses an IP address located in Munich during the time period indicated by network-based service data associated that data in a review. Usage data that includes use of an IP address in Munich during that time period can provide corroboration to indicate strong consistency that can boost a consistency score. Usage data that includes use of an IP address in Bombay during that time period can provide a contradiction to indicate weak consistency that will lower the consistency score. Usage data that includes no usage during that time period can be a fairly neutral indication of authenticity that may not change the consistency score.

In another example, when a network-based server 310 providing asocial network site, such as FACEBOOK®., receives an application for anew user account, the network-based server 310 can automatically request and receive usage data associated with an email address provided by the new user. The usage data may be compared to predetermined criteria to determine whether the email account is, for example, at least 90 days old and has exchanged at least X emails during a certain time period, each email containing not less than fifty words.

In embodiments, user verification can be used to allow access to network-based services based on a comparison of usage data to predetermined criteria. Such user verification can prevent unscrupulous individuals from setting up false social network accounts with newly-minted email addresses. Minimizing false social network accounts can prevent or mitigate social account usage for illegal or distasteful purposes, such as soliciting child sex, or ranting against a classmate, company, or public figure with the cloak of anonymity. Additionally, verification of users based on usage data can prevent or mitigate establishment of social network accounts meant to impersonate another person without permission, such as for the purpose of causing other users to believe that the social network account is associated with the other person. The necessity to circumvent usage data verification process can deter improper use of services provided by the network-based server 310, since establishing usage data that would meet the predetermined criteria can be time consuming and tedious.

In an embodiment, conventions of types of usage data and/or consistency data to use for verification and standardization of usage data formats can be established to increase usage among different parties. Trends and standardization can be established by email servers and/or network-based servers requiring user verification using usage data and/or consistency data. A service of user verification using usage data and/or consistency data can be provided as a courtesy or for a fee.

User verification using usage data and/or consistency data by second-party servers 304 can boost user-confidence and increase popularity. Email servers that perform user verification using usage data and/or consistency data may refuse to exchange emails with email servers that do not provide such user verification services. Users may choose to only use services provided by network-based servers 310 that boost security and user-confidence by performing user verification using usage data and/or consistency data.

In embodiments a third-party server 320 can set user verification standards for a server it interacts with, wherein the server or the third-party server 320 perform the user verification. Standards can govern, for example, which types of usage data to use, which types of predetermined criteria to use as a threshold, and which actions to take (e.g., which delivery treatments to use or which level of services to allow) when the predetermined criteria are not met.

Figure 7:
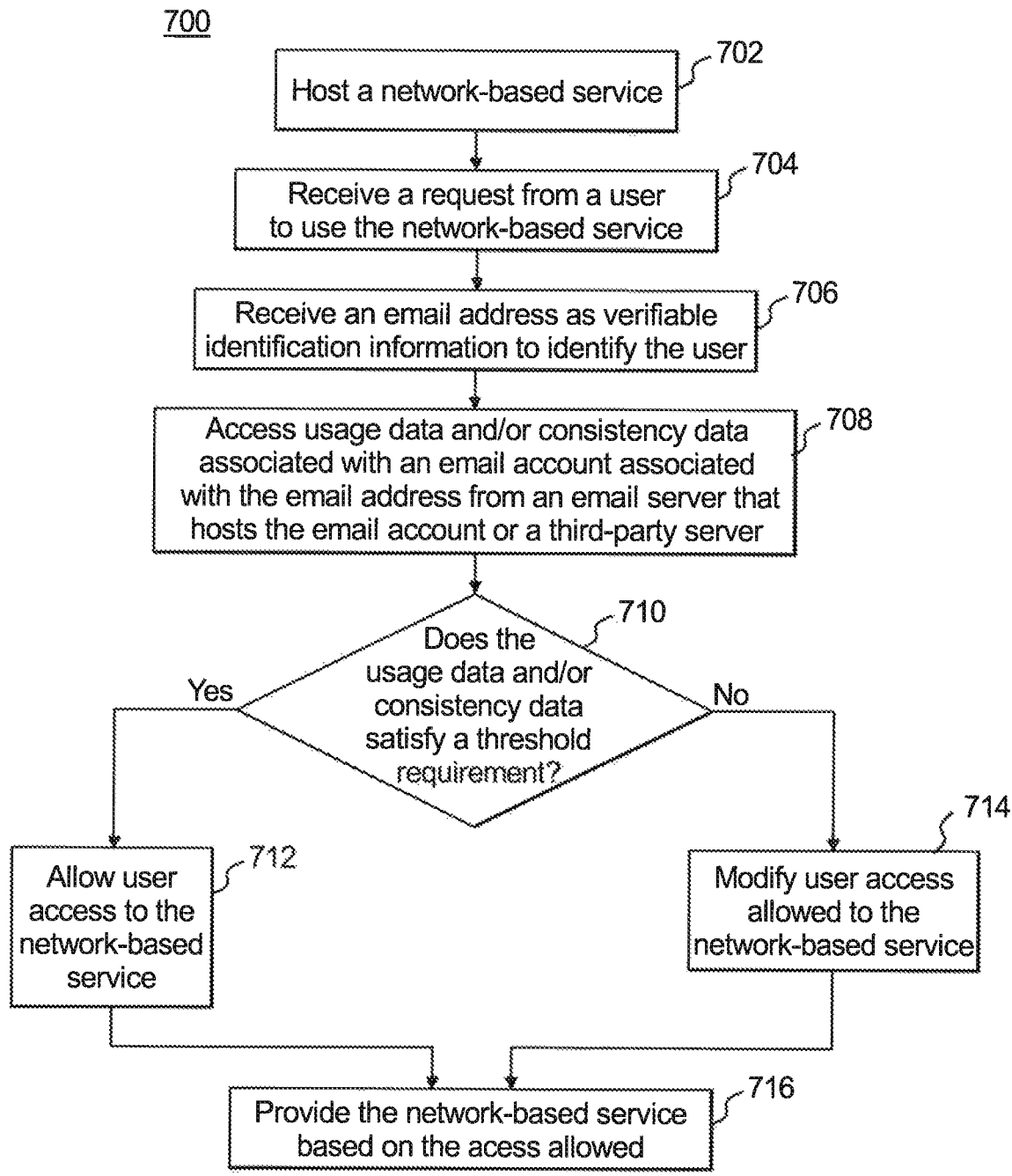
FIG. 7 is a flowchart illustrating an example method performed by a network-service provider of the usage data verification system shown in FIG. 3 in accordance with embodiments of the disclosure.

FIG. 7 shows a flowchart 700 of operations performed in accordance with an embodiment of a method of the disclosure. In various embodiments, the operations shown in flowchart 700 can be performed by a network-based server that provides a service to users, such as the network-based server 310. At operation 702, a network-based service is hosted. At operation 704, a request to use the network-based service is received from a user. In embodiments, the network-based server 310 provides services such as at least one of posting data to a website; responding to a social-network prompt; entering data in a query box in a website; participating in an online chat or forum; submitting a consumer review of a product or service; submitting a private or public message via a website; voting in a poll; transacting a financial transaction.

At operation 706, an email address is received as verifiable identification information to identify the user. At operation 708, a usage report, usage data and/or consistency data associated with an email account that corresponds to the email address is accessed. The usage data can be requested or retrieved from an email server that hosts the email account or a third-party server. For example, the network-based server 310 can submit an identity verification request with the received email address to the email server that hosts the email account associated with the email address or to a third-party server 320. A usage report, usage data, and/or consistency data associated with the email account can be transmitted to the network-based server 310 in response to the identity verification request.

At operation 710, a determination is made whether the usage report, usage data, and/or consistency data satisfy a threshold requirement. If the determination at operation 710 is YES, then the method continues at operation 712. At operation 712, the user is allowed access to the network-based service. The method continues at operation 716. If the determination at operation 710 is NO, then the method continues at operation 714. At operation 714, a modification is made to access allowed by the user to the network-based service. The modification can include, for example, disallowing the user from using the services; delaying allowing the user from using the services pending further investigation; disallowing the user from using the services and acting to cancel an account associated with the user for using the services. At operation 716, the user is provided with network-based service based on the access allowed.

Figure 8:
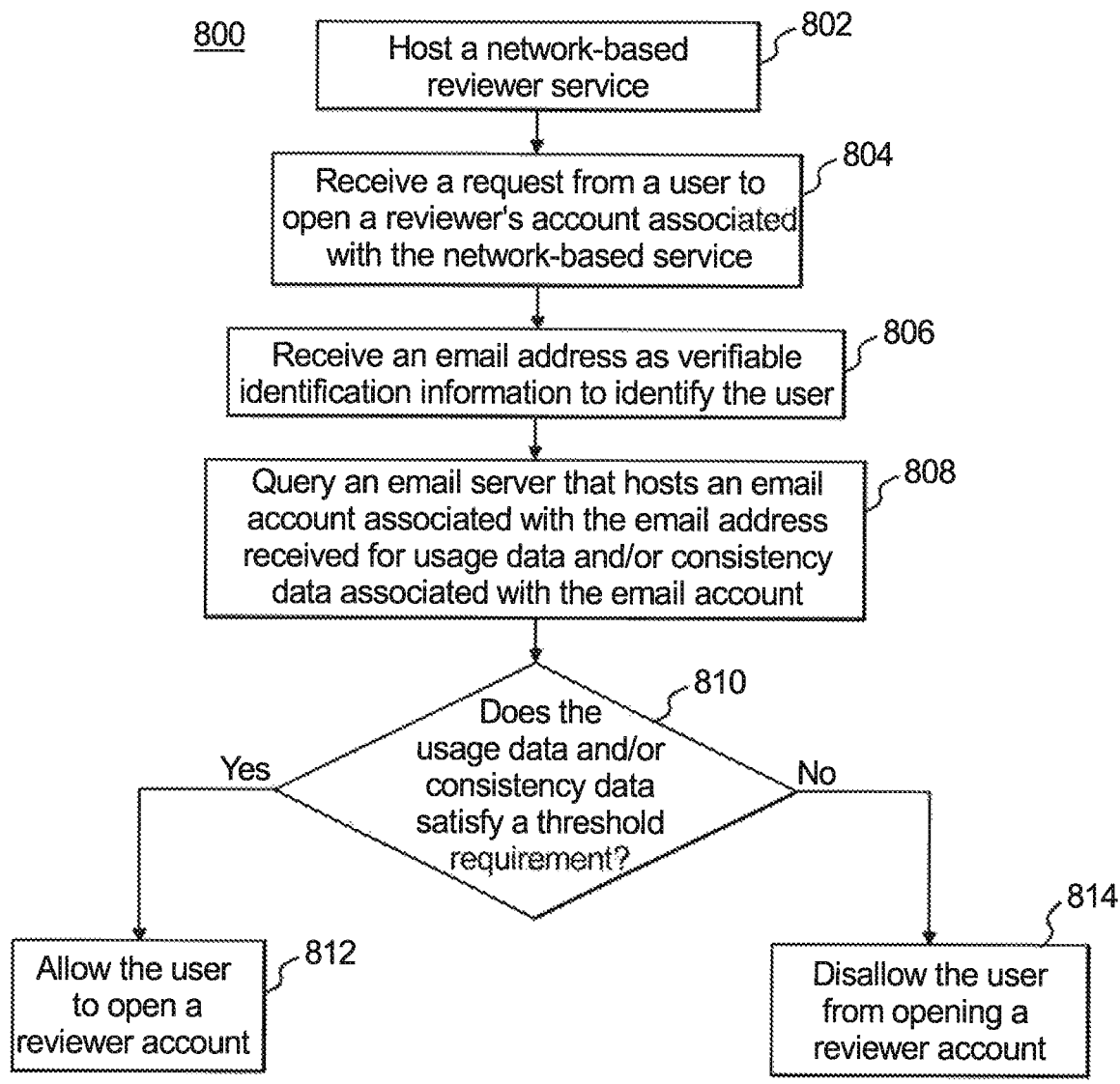
FIG. 8 is a flowchart illustrating another example method performed by a server of the usage data verification system shown in FIG. 3 in accordance with embodiments of the disclosure.

FIG. 8 shows a flowchart 800 of operations performed in accordance with an embodiment of a method of the disclosure. In various embodiments, the operations shown in flowchart 800 can be performed by a network-based server that provides a service to users, such as the network-based server 310. At operation 802, a network-based reviewer service, such as TRIPADVISOR® is hosted. At operation 804, a request is received from a user to open a reviewer's account associated with the network-based service. At operation 806, an email address is received as verifiable identification information to identify the user. At operation 808, a query is transmitted to an email server that hosts an email account associated with the email address. The query requests a usage report, usage data, and/or consistency data associated with the email account. At operation 810, a determination is made whether the usage report, usage data, and/or consistency data satisfies a threshold requirement of the reviewer service. If the determination at operation 810 is YES, then at operation 812, the user is allowed to open a reviewer account. If the determination at operation 810 is NO, then at operation 814, the user is disallowed from opening a reviewer account.

Figure 9:
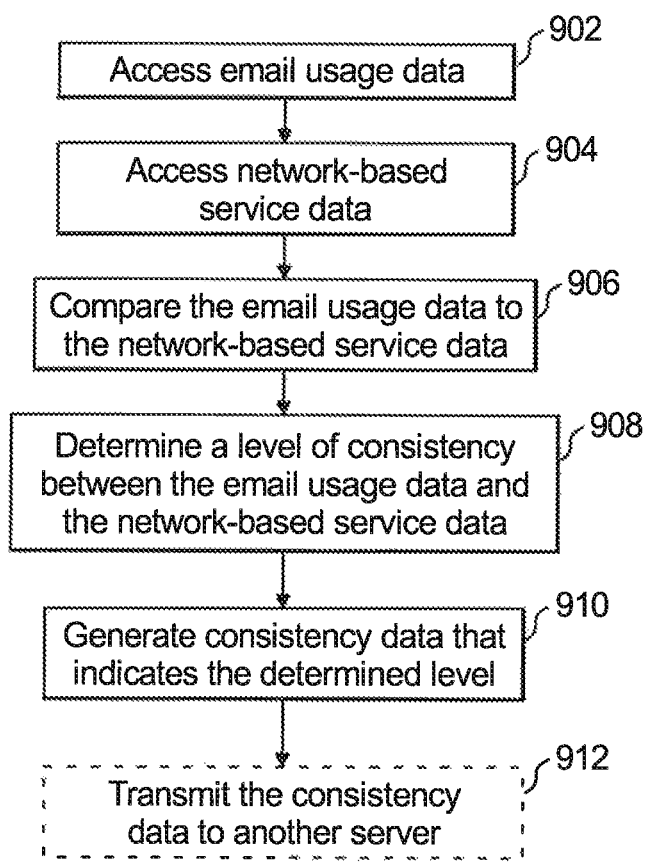
FIG. 9 is a flowchart illustrating another example method performed by a server of the usage data verification system shown in FIG. 3 in accordance with embodiments of the disclosure.

FIG. 9 shows a flowchart 900 of operations performed in accordance with an embodiment of a method of the disclosure. In various embodiments, the operations shown in flowchart 900 can be performed by a third-party server, such as third-party server C 326, an email server, such as first or second email servers 302 or 308, or a network-based server, such as network-based server 310. At operation 902, email usage data is accessed. At operation 904, network-based service data is accessed. At operation 906, the email usage data and the network-based service data are compared. At operation 908, a level of consistency between the email usage data and the network-based service data is determined by performing a consistency analysis. At operation 910, consistency data is generated that indicates the determined level of consistency between the email usage data and the network-based service data. At operation 912, the consistency data is transmitted to another server. Operation 912 is depicted using dotted lines, as operation 912 is an operation that would be performed by third-party server, but may not be performed by certain servers that would use the consistency data to make a determination, such as an email server or network-based service server.

Figure 10:
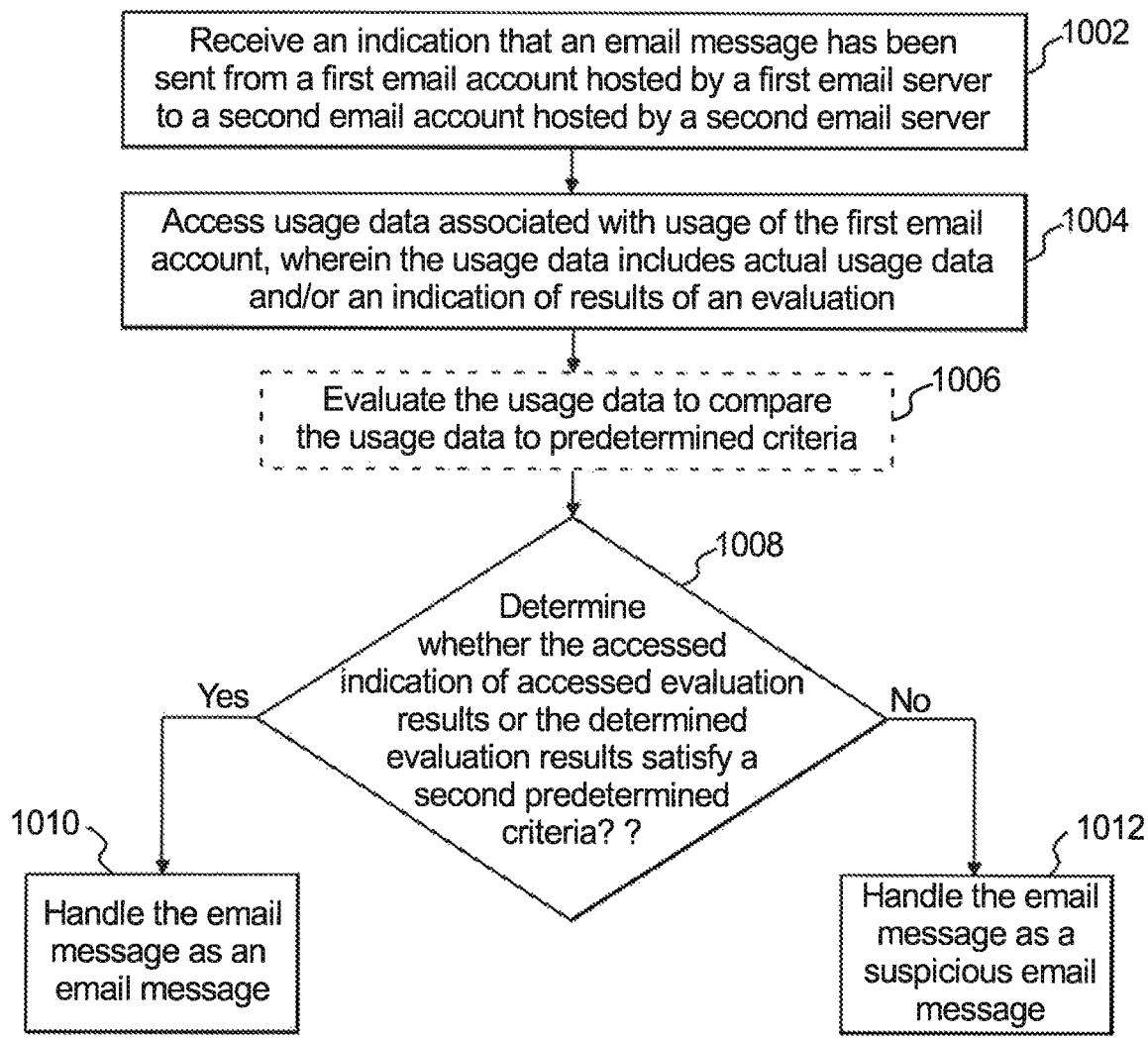
FIG. 10 is a flowchart illustrating another example method performed by a computing device of the usage data verification system shown in FIG. 3 in accordance with embodiments of the disclosure.

FIG. 10 shows a flowchart 1000 of operations performed in accordance with an embodiment of a method of the disclosure. In various embodiments, the operations shown in flowchart 1000 can be performed by a computing device that receives an email message sent from a first email account of a first email server. The first email account is used by a first individual, wherein the individual is a user of the first email account. The computing device can be configured, for example, similar to computing device 311 or cloud-based computing device 313.

At operation 1002, an indication is received that the email message has been sent from the first email account hosted by a first email server, similar to first email server 302, to a second email account hosted by a second email server, similar to second email server 304. At operation, 1004 the usage data associated with usage of the first email account is accessed. The usage data can be accessed from the first email server or a third-party server, similar to third-party servers 320, that stores and/or evaluates the usage data. The usage data can include actual usage data, and/or an indication (e.g., a score, a binary result, etc.) of results of an evaluation. The evaluation can compare the usage data to predetermined criteria, such as profiling criteria that indicate the first email account is consistent with a primary email account model of the first individual. Accessing the usage data can include requesting and receiving the usage data, retrieving the usage data from a stored location, and/or receiving the usage data, such as based on a predetermined protocol, etc.

At operation 1006, the usage data is evaluated, such as by comparing the usage data to predetermined criteria, e.g., a model primary email account. Operation 1006 may be omitted, as indicated by the dotted lines, if evaluation results were received with the usage data that was accessed at operation 1004. The results of the evaluation can include, for example, a score or a binary result.

At operation 1008, a determination is made whether the results of the evaluation accessed at operation 1004 or performed at operation 1006 satisfy second predetermined criteria. The second predetermined criteria can be a threshold evaluation result. If the determination at operation 1008 is YES, then at operation 1010 the email message is handled as an allowed email message. Treating the email message as an allowed email message can include, for example and without limitation, allowing the email message to be received in the inbox of the second email account, storing the email message with an indication of approval, and/or storing the email message with permission for the email message to be opened by the second individual without a warning that the email message is not from an approved sender.

If the determination at operation 1008 is NO, then at operation 1012 the email message is handled as a suspicious email message that indicates inappropriate, e.g., malicious email behavior. Treating the email message as a suspicious email message can include, for example and without limitation, preventing the email message from being received in the inbox of the second email account, storing the email message with an indication of being suspicious, deleting the email message so that it is not stored in association with the second email account, storing the email message without allowing the second individual to open the email message; and/or storing the email message and allowing the second individual to open the email message in conjunction with a warning that the email message is not from an approved sender.

Advantages to using usage data verification for opening new email accounts and other network-based accounts include deterring usage of inappropriate email accounts and receipt of unsolicited or malicious emails associated with behaviour such as spam, cyber-stalking, cyber-bullying, transmission of malware, spurious reviewing of products and services, and computer hi-jacking. Email servers and network-based servers can reduce multiple dummy accounts and reduce potential liability for malicious online behaviour. Additionally, email servers and network-based servers can use their own usage data or corroborated data or usage and consistency data obtained from other servers to periodically cull email accounts and eliminate abandoned or unused. Users of email and network-based servers will benefit by a reduction in unsolicited emails and malicious online behaviour.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

The invention claimed is:

1. A method to reduce inappropriate online behavior, the method comprising:
   providing a network service;
   receiving a request from a user to use the network service; and
   requesting a usage report about an email account associated with the user from an email server hosting the email account or a third-party server that has a contractual relationship with the email server for accessing the usage report or for generating the usage report,
   wherein:
      the usage report is based on analysis of usage data representative of a history of usage of the email account, including history of incoming and outgoing emails as obtained from the email server or the third-party server,
      the analysis of the usage data is based on determining whether parameters of the usage data are consistent with a model of a primary email account, the parameters of the usage data including at least one of a date that the email account was established, tracked history of emails received by the email account, and a history of IP addresses and geographic locations of IP addresses used when accessing the email account for communicating with multiple other email accounts, and the usage data is unrelated to content included in email messages exchanged by the email account, and
      either a first level or a second level of availability or unavailability of the network service available to the user is selected, wherein selection of the first or second level of availability or unavailability of the network service is based on whether the usage report meets selectable criteria.

2. The method of claim 1, wherein the usage report indicates at least one of: statistics associated with a number of email messages exchanged with the email account; statistics associated with a size of messages exchanged with the email account; statistics associated with a type of one or more attachments exchanged with the email account; an indication whether the email account has an associated profile picture; and an indication whether the email account has an associated verified telephone number.

3. The method of claim 1, wherein the network-based service includes at least one of posting data to a website; responding to a social-network prompt; entering data in a query box in a website; participating in an online chat or forum; submitting a consumer review of a product or service; exchanging private or public messages; voting in a poll; and transacting a financial transaction.

4. The method of claim 1, further comprising:
   selecting the first level or the second level of availability or unavailability of the network service of the network service; and
   providing availability of the network service based on which the selected level of the first and second levels of availability or unavailability of the network service.

5. The method of claim 4, wherein the request is to establish a new account for the user to have access to the network service, and providing the network service includes establishing the new account when the first level of availability or unavailability of the network service is selected, and denying establishment of the new account when the second level of availability or unavailability of the network service is selected.

6. The method of claim 4, wherein the request is to use the network service using an account already established for the user, and providing the network service includes allowing the user unreduced usage of the network service when the first level of availability or unavailability of the network service is selected, and prohibiting the user usage of the network service requested or allowing reduced usage of the network service when the second level of availability or unavailability of the network service is selected.

7. The method of claim 4, further comprising:
   selecting the second level of availability or unavailability of the network service when the usage report does not meet the selectable criteria;
   denying availability of the network service or providing a reduced availability of the network service when the second level of availability or unavailability of the network service is selected;
   selecting the first level of availability or unavailability of the network service when the usage report does meet the selectable criteria; and
   providing a non-reduced availability of the network service when the first level of availability or unavailability of the network service is selected.

8. The method of claim 1, wherein the network service is a social media service.

9. The method of claim 1, wherein the usage report includes at least a portion of the usage data and the usage report about the email account is requested from the email server hosting the email account without using a third-party server.

10. The method of claim 1, wherein the usage report indicates whether the email account has sent and received a predetermined number of emails during a certain time period.

11. The method of claim 1, wherein the usage report indicates whether the usage data is consistent with a primary email account model.

12. The method of claim 1, further comprising selecting the first or second level based on a determined level of consistency between network-based service data indicative of usage of the network service by the user and the usage data.

13. The method of claim 12, further comprising:
comparing the network-based service data to the usage data; and
generating consistency data based on the comparison, wherein the consistency data indicates a level of consistency between the usage data and the network-based service data, the level of consistency being based on at least one of (a) consistency between a geographic location of an IP address associated with usage of the email account and the network based service and (b) consistency between an age or occupation of the user indicated by a profile or usage associated with the email account and a profile or usage associated with the usage of the network-based service by the user,
wherein the selection of the first or second level of availability or unavailability of the network service is based on a level of consistency indicated by the consistency data.

14. The method of claim 13, further comprising determining the level of consistency based on temporal and location data associated with the usage data as compared with temporal and location data associated with usage of the network-based service data by the user.

15. A server comprising:
a memory configured to store a plurality of programmable instructions; and
at least one processing device in communication with the memory, wherein the at least one processing device, upon execution of the plurality of programmable instructions is configured to:
provide a network service;
receive a request from a user to use the network service; and
request a usage report about an email account associated with the user from an email server hosting the email account or a third-party server that has a contractual relationship with the email server for accessing the usage report or for generating the usage report,
wherein:
the usage report is based on analysis of usage data representative of a history of usage of the email account, including history of incoming and outgoing emails as obtained from the email server or the third-party server,
the analysis of the usage data is based on determining whether parameters of the usage data are consistent with a model of a primary email account, the parameters of the usage data including at least one of a date that the email account was established, tracked history of emails received by the email account and a history of IP addresses and geographic locations of IP addresses used when accessing the email account for communicating with multiple other email accounts, and the usage data is unrelated to content included in email messages exchanged by the email account, and
either a first level or a second level of availability or unavailability of the network service available to the user is selected, wherein selection of the first or second level of availability or unavailability of the network service is based on whether the usage report meets selectable criteria.

16. The server of claim 15, wherein the processor, upon execution of the plurality of programmable instructions is configured to:
select the first level or the second level of availability or unavailability of the network service; and
provide availability of the network service based on the selected level of the first and second levels of availability or unavailability of the network service.

17. The server of claim 16, wherein the request is to establish a new account for the user to have access to the network-based service, and providing the network service includes establishing the new account when the first level of availability or unavailability of the network service is selected, and denying establishment of the new account when the second level of availability or unavailability of the network service is selected.

18. The server of claim 16, wherein the processor, upon execution of the plurality of programmable instructions is configured to:
select the second level of availability or unavailability of the network service when the usage report does not meet the selectable criteria;
deny availability of the network service or providing reduced availability of the network service when the second level of availability or unavailability of the network service is selected;
select the first level of availability or unavailability of the network service when the usage report does meet the selectable criteria; and
provide non-reduced availability of the network service when the first level of availability or unavailability of the network service is selected.

19. The server of claim 15, wherein the network service provided is a social media service.

20. The server of claim 15, wherein the usage report includes at least a portion of the usage data.

21. The server of claim 15, wherein the usage report includes at least statistics calculated based on the usage data.

22. The server of claim 15, wherein the usage report indicates whether the usage data is consistent with a primary email account model.

23. The server of claim 15, wherein the processor, upon execution of the plurality of programmable instructions is further configured to select the first or second level of availability or unavailability of the network service based on a determination of consistency between network-based service data indicative of usage of the network service by the user and the usage data.

24. The server of claim 23, wherein the processor, upon execution of the plurality of programmable instructions is further configured to:
compare the network-based service data to the usage data; and
generate consistency data based on the comparison, wherein the consistency data indicates a level of consistency between the usage data and the network-based service data, the level of consistency being based on at least one of (a) consistency between a geographic location of an IP address associated with usage of the email account and the network based service and (b) consistency between an age or occupation of the user indicated by a profile or usage associated with the email account and a profile or usage associated with the usage of the network-based service by the user, wherein selection of the first or second level of availability or unavailability of the network service is based on a level of consistency indicated by the consistency data.

25. The server of claim 24, wherein the processor, upon execution of the plurality of programmable instructions is configured to determine the level of consistency based on temporal and location data associated with the usage data as compared with temporal and location data associated with usage of the network-based service data by the user.

26. The server of claim 15, wherein the usage report indicates at least one of: statistics associated with a number of email messages exchanged with the email account; statistics associated with a size of messages exchanged with the email account; statistics associated with a type of one or more attachments exchanged with the email account; an indication whether the email account has an associated profile picture; and an indication whether the email account has an associated verified telephone number.

27. The server of claim 15, wherein the network-based service includes at least one of posting data to a website; responding to a social-network prompt; entering data in a query box in a website; participating in an online chat or forum; submitting a consumer review of a product or service; exchanging a private or public message; voting in a poll; and transacting a financial transaction.

28. The server of claim 15, wherein the request is to use the network service using an account already established for the user, and providing the network service includes allowing the user unreduced usage of the network service when the first level of availability or unavailability of the network service is selected, and prohibiting the user usage of the network service or allowing a reduced usage of the network service when the second level of availability or unavailability of the network service is selected.

29. A non-transitory computer readable storage medium and one or more computer programs embedded therein, the computer programs comprising instructions, which when executed by a computer system, cause the computer system to:

provide a network service;

receive a request from a user to use the network service; and request a usage report about an email account associated with the user from an email server hosting the email account or a third-party server that has a contractual relationship with the email server for accessing the usage report or for generating the usage report, wherein:

the usage report is based on analysis of usage data representative of a history of usage of the email account, including history of incoming and outgoing emails as obtained from the email server or the third-party server;

the analysis of the usage data is based on determining whether parameters of the usage data are consistent with a model of a primary email account, the parameters of the usage data including at least one of a date that the email account was established, tracked history of emails received by the email account, and a history of IP addresses and geographic locations of IP addresses used when accessing the email account for communicating with multiple other email accounts, and the usage data is unrelated to content included in email messages exchanged by the email account, and either a first level or a second level of availability or unavailability of the network service available to the user is selected, wherein selection of the first or second level of availability or unavailability of the network service is based on whether the usage report meets selectable criteria.

30. The computer readable storage medium of claim 29, wherein the computer system, when executing the computer programs, is further caused to:

select the first level or the second level of availability or unavailability of the network service; and provide availability of the network service based on which the selected level of the first and second levels of availability or unavailability of the network service is selected.

* * * * *